(12) United States Patent
Marra et al.

(10) Patent No.: US 9,141,778 B2
(45) Date of Patent: Sep. 22, 2015

(54) CONTROLLING ACCESS TO AN ACCESSIBLE OBJECT WITH AN ONLINE ACCESS CONTROL LIST

(71) Applicant: Google Inc., Mountain View, CA (US)

(72) Inventors: Gregory Matthew Marra, San Francisco, CA (US); Sean Liu, Boston, MA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 13/970,568

(22) Filed: Aug. 19, 2013

(65) Prior Publication Data

US 2014/0059660 A1    Feb. 27, 2014

Related U.S. Application Data

(60) Provisional application No. 61/691,755, filed on Aug. 21, 2012.

(51) Int. Cl.
| | |
|---|---|
| *H04L 29/06* | (2006.01) |
| *G06F 21/31* | (2013.01) |
| *G06F 21/33* | (2013.01) |
| G06F 15/16 | (2006.01) |
| G06F 17/30 | (2006.01) |

(52) U.S. Cl.
CPC .............. *G06F 21/31* (2013.01); *G06F 21/335* (2013.01); *H04L 63/08* (2013.01); *H04L 63/101* (2013.01); *G06F 2221/2141* (2013.01)

(58) Field of Classification Search
CPC . G06F 21/31; G06F 2221/2141; G06Q 50/01; H04L 63/00; H04W 12/06
See application file for complete search history.

(56) References Cited

U.S. PATENT DOCUMENTS

| | | | |
|---|---|---|---|
| 2005/0154925 A1 | 7/2005 | Chitrapu et al. | |
| 2008/0132259 A1 | 6/2008 | Vin | |
| 2009/0282144 A1* | 11/2009 | Sherrets et al. | 709/224 |
| 2009/0292814 A1* | 11/2009 | Ting et al. | 709/229 |
| 2010/0070758 A1 | 3/2010 | Low et al. | |
| 2010/0180032 A1 | 7/2010 | Lunt | |
| 2010/0208662 A1 | 8/2010 | Fuste Vilella et al. | |
| 2011/0023101 A1* | 1/2011 | Vernal et al. | 726/7 |
| 2012/0110640 A1* | 5/2012 | Donelson et al. | 726/3 |

(Continued)

FOREIGN PATENT DOCUMENTS

WO    2012109486    8/2012

OTHER PUBLICATIONS

International Search Report dated Apr. 10, 2014 in PCT/US2013/055633.

*Primary Examiner* — Dede Zecher
*Assistant Examiner* — Trang Doan
(74) *Attorney, Agent, or Firm* — Lowenstein Sandler LLP

(57) ABSTRACT

Software on a router receives configuration data that specifies a social networking service as a source for authentication according to an authentication protocol. Subsequently, the router software receives packet data from a client device for a destination other than the social networking service. The router software causes software on the client device to display a login view for the social networking service. The router software transmits the login data entered in the login view to the social networking service. And the router software receives an authorization code following a successful login by a user identified on an access control list (ACL). Then the router software transmits the packet data to the destination.

18 Claims, 10 Drawing Sheets

(56) References Cited

U.S. PATENT DOCUMENTS

| | | | |
|---|---|---|---|
| 2012/0284615 A1* | 11/2012 | Zuckerberg et al. | 715/234 |
| 2012/0304265 A1* | 11/2012 | Richter et al. | 726/7 |
| 2013/0018948 A1* | 1/2013 | Douillet et al. | 709/204 |
| 2013/0067081 A1* | 3/2013 | Liu et al. | 709/225 |
| 2013/0144785 A1* | 6/2013 | Karpenko et al. | 705/44 |
| 2013/0218765 A1* | 8/2013 | Hammad et al. | 705/41 |
| 2013/0239185 A1* | 9/2013 | Orttung et al. | 726/5 |
| 2013/0254850 A1* | 9/2013 | Alison et al. | 726/4 |
| 2013/0346587 A1* | 12/2013 | Barkett et al. | 709/224 |
| 2014/0026201 A1* | 1/2014 | Srinivasan et al. | 726/7 |

* cited by examiner

CONTROLLING ACCESS TO AN ACCESSIBLE OBJECT WITH AN ONLINE ACCESS CONTROL LIST

PRIORITY

This application is a non-provisional application that claims priority to a provisional application, namely, U.S. Patent Application Ser. No. 61/691,755, also entitled "Controlling Access to an Accessible Object with an Online Access Control List", filed on Aug. 21, 2012. The disclosure of the provisional application is incorporated herein by reference for all purposes.

BACKGROUND

At some social networking services, a user will have a profile and an associated content stream that are accessible (e.g., for viewing and/or posting) by (1) the user and (2) other users or entities that the user follows, according to the settings of an access control list (ACL) controlled by the user and maintained by the social networking service.

Similarly, some social networking services have implemented authorization protocols so that a user of such a service can share data, including content and access control list (ACLs), in a limited fashion with other software services (e.g., a software service hosting an online publication) without requiring the user to hand out his/her credentials (e.g., username and password). Instead, the other software services receive a username-pas sword token of limited duration and scope.

SUMMARY

Some implementations involve a computer-implemented method. According to the method, software on a router receives configuration data that specifies a social networking service as a source for authentication according to an authentication protocol. Subsequently, the router software receives packet data from a client device for a destination other than the social networking service. The router software causes software on the client device to display a login view for the social networking service. The router software transmits the login data entered in the login view to the social networking service. And the router software receives an authorization code following a successful login by a user identified on an access control list (ACL). Then the router software transmits the packet data to the destination.

In some implementations of this method, the software on the router transmits and receives data according to a WiFi protocol or limits access in duration or scope. Also, in some implementations of this method, the ACL is maintained by the social networking service, whereas in other implementations, the ACL is maintained by the router. It will be appreciated that the method is advantageous, for among other things, conveniently and safely sharing the use of a router among groups trusted by the owner of the router.

Other implementations involve an apparatus, namely, a computer-readable storage medium that persistently stores a program. The program might be part of the software on a router. The program receives configuration data that specifies a social networking service as a source for authentication according to an authentication protocol. Subsequently, the program receives packet data from a client device for a destination other than the social networking service. The program causes software on the client device to display a login view for the social networking service. The program transmits the login data entered in the login view to the social networking service. And the program receives an authorization code following a successful login by a user identified on an ACL. Then the program transmits the packet data to the destination.

In some implementations of this apparatus, the program transmits and receives data according to a WiFi protocol or limits access in duration or scope. Also, in some implementations of this apparatus, the ACL is maintained by the social networking service, whereas in other implementations, the ACL is maintained by the router. It will be appreciated that the apparatus is advantageous, for among other things, conveniently and safely sharing the use of a router among groups trusted by the owner of the router.

Other implementations involve an apparatus, namely, a system that executes instructions. The instructions might be part of the software on a router. The instructions receive configuration data that specifies a social networking service as a source for authentication according to an authentication protocol. Subsequently, the instructions receive packet data from a client device for a destination other than the social networking service. The instructions cause software on the client device to display a login view for the social networking service. The instructions transmit the login data entered in the login view to the social networking service. And the instructions receive an authorization code following a successful login by a user identified on an ACL. Then the instructions transmit the packet data to the destination.

In some implementations of this apparatus, the instructions transmit and receive data according to a WiFi protocol or limit access in duration or scope. Also, in some implementations of this apparatus, the ACL is maintained by the social networking service, whereas in other implementations, the ACL is maintained by the router. It will be appreciated that the apparatus is advantageous, for among other things, conveniently and safely sharing the use of a router among groups trusted by the owner of the router.

Still other implementations involve another computer-implemented method. According to this method, software provides for display a login view for a social networking service. The social networking service acts as a source for authentication according to an authentication protocol. Providing the technical effect that the information required for authentication and authorization is maintained centrally by a social networking service, thus avoiding duplication of such information, thus facilitating maintenance of such information, and thus providing consistent information for authentication and authorization. Moreover, the settings of access control lists (ACLs) may be controlled by the users of the social networking service, thus enhancing user control over authorization information and simplifying maintenance of authorization information. The software receives an authorization code from the social networking service, if a user of a client device is identified on an ACL for an accessible object that is separate from the social networking service. Then the software transmits the authorization code to a controller for the accessible object and gains access to the accessible object. Providing the technical effect that the accessible object may not be involved in processing the authentication protocol. In particular, login data, such as username and password, of a user to a social networking service may not be exposed to the accessible device during the authentication protocol, thus limiting the spread of critical login data, thus enhancing system security and privacy.

In some implementations of this method, the ACL is maintained by the social networking service, whereas in other implementations, the ACL is maintained by the client device.

Also in some implementations of this method, the software receives an identification number for an accessible object and transmits the identification number to the social networking service, along with login data. And in some implementations of this method, the accessible object is a space. It will be appreciated that the method is advantageous, for among other things, conveniently and safely sharing the use of an accessible object among groups trusted by the owner of the accessible object.

Other implementations involve an apparatus, namely, a computer-readable storage medium that persistently stores a program. A program provides for display a login view for a social networking service. The social networking service acts as a source for authentication according to an authentication protocol. The program receives an authorization code from the social networking service, if a user of a client device is identified on an ACL for an accessible object that is separate from the social networking service. Then the program transmits the authorization code to a controller for the accessible object and gains access to the accessible object.

In some implementations of this apparatus, the ACL is maintained by the social networking service, whereas in other implementations, the ACL is maintained by the client device. Also in some implementations of this apparatus, the program receives an identification number for an accessible object and transmits the identification number to the social networking service along with login data. And in some implementations of this apparatus, the accessible object is a space. It will be appreciated that the apparatus is advantageous, for among other things, conveniently and safely sharing the use of an accessible object among groups trusted by the owner of the accessible object.

Other implementations involve an apparatus, namely, a system that executes instructions. The instructions provide for display a login view for a social networking service. The social networking service acts as a source for authentication according to an authentication protocol. The instructions receive an authorization code from the social networking service, if a user of a client device is identified on an ACL for an accessible object that is separate from the social networking service. Then the instructions transmit the authorization code to a controller for the accessible object and gain access to the accessible object.

In some implementations of this apparatus, the ACL is maintained by the social networking service, whereas in other implementations, the ACL is maintained by the client device. Also in some implementations of this apparatus, the instructions receive an identification number for an accessible object and transmit the identification number to the social networking service along with login data. And in some implementations of this apparatus, the accessible object is a space. It will be appreciated that the apparatus is advantageous, for among other things, conveniently and safely sharing the use of an accessible object among groups trusted by the owner of the accessible object.

DETAILED DESCRIPTION

In the following description, numerous specific details are set forth in order to provide a thorough understanding. However, it will be apparent to one skilled in the art that some implementations may be practiced without some of these specific details.

Figure 1:
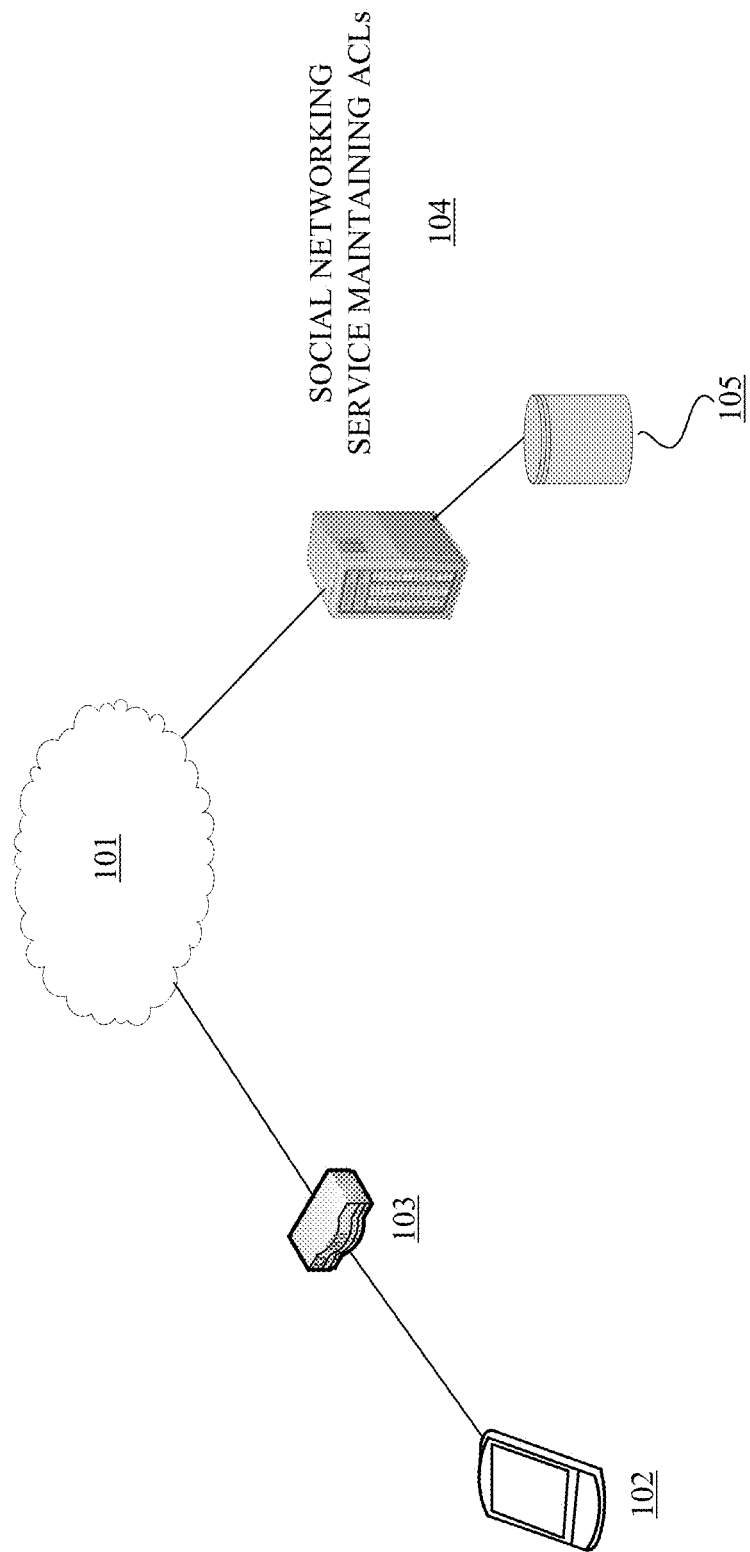
FIG. 1 is a network diagram for a configured router, in accordance with some implementations.

FIG. 1 is a network diagram for a configured router, in accordance with some implementations. As depicted in this figure, a computing device 102 (e.g., a smartphone, tablet, laptop, etc.) is connected by a router 103 (e.g., that implements the WiFi protocol) to a network 101 (e.g., a wide area network (WAN) including the Internet, which might be wireless in part or in whole). Also connected to the network 101 is social networking service 104 hosting an online social network or social graph.

As used here and elsewhere in this disclosure, the term "social networking service" is to be broadly interpreted to include any software service that supports functionality for "bookmarking and sharing" (e.g., archiving/searching and broadcasting) content, including social networking services, social media services, blogging services, online discussion services, and software services that facilitate message transmission (e.g., according to a messaging protocol such as email, instant messaging, short message service (SMS), audio and/or video chat, etc.). In this regard, it will be appreciated that an email (e.g., spam) filter can be thought of as a type of ACL (e.g., controlling access to content), as can a whitelist and/or blacklist, a distribution list, a contact list, a buddy list, etc.

In some implementations, social networking service 104 might be composed of a number of servers connected by a network (e.g., a local area network (LAN) or a WAN) to each other in a cluster or other distributed system which might execute cloud platform software. The servers at social networking service 104 might also be connected (e.g., by a storage area network (SAN)) to persistent storage 105. In some implementations, persistent storages 105 might include a redundant array of independent disks (RAID).

In some implementations, persistent storage 105 might be used to store ACLs associated with users of the social network hosted by social networking service 104. Also in some implementations, computing device 102 (e.g., if it is a laptop) and the servers in social networking service 104 might include (1) hardware consisting of one or more microprocessors, volatile storage (e.g., RAM), and persistent storage (e.g., a solid-state drive, flash memory, or a hard disk), and (2) an operating system that runs directly or indirectly (e.g., through virtualization software) on the hardware. Alternatively, the operating system for the servers in software service 104 might be replaced by a hypervisor or other virtualization software. In some implementations, computing device 102 might be a smartphone, tablet computer, or other mobile device that includes (1) hardware consisting of one or more low-power microprocessors, volatile storage (e.g., RAM), and persistent storage (e.g., flash memory such as microSD) and (2) an operating system that runs on the hardware.

In some implementations, computing device 102 might include a web browser as an application program or part of an operating system. It will be appreciated that users of computing device 102 might use browsers to communicate with software running on the servers at social networking service 104. Alternatively, users of computing device 102 might use other application programs to communicate with software running on the servers at social networking service 104. For example, users of computing device 102 might use a hybrid app (e.g., an app written in Objective C or Java that includes embedded HTML5) to communicate with software running on the servers at social networking service 104, if computing device 102 is a smartphone or tablet. It will be appreciated that an application program for a mobile computing device is often referred to as an "app".

In some implementations, the webserver and database software for the servers in social networking service 104 might be implemented using a public, private, or hybrid cloud platform, e.g., a hybrid cloud platform with a public cloud and a private cloud. In other implementations, software for the servers at social networking service 104 might be implemented without resort to third-party cloud platforms, e.g., using webserver software, structured database-management software, load balancing and virtualization software, distributed memory-caching software, other distributed computing software, etc.

Figure 2:
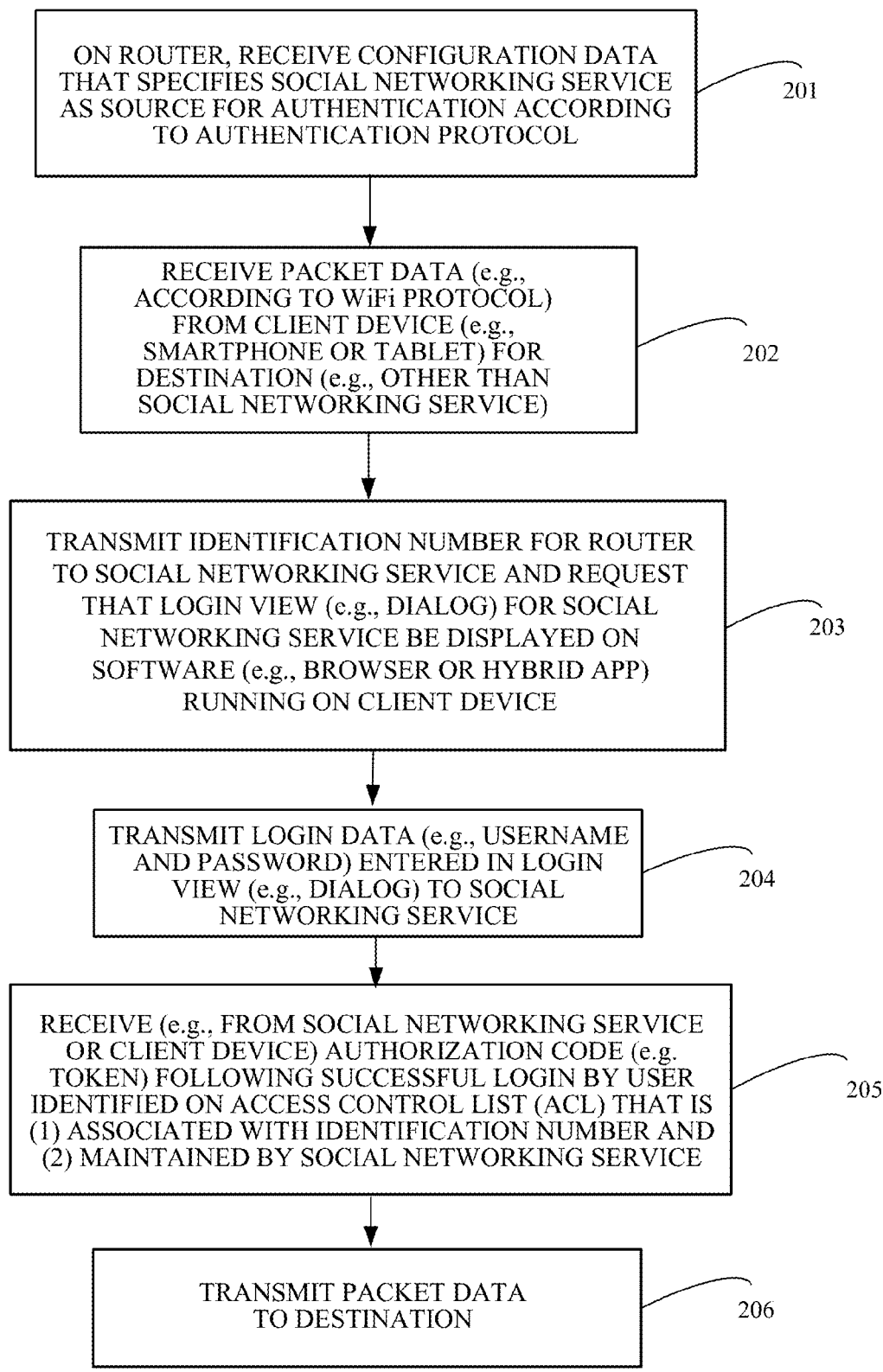
FIG. 2 is a flowchart diagram that illustrates a process for authorizing a user of a router, in accordance with some implementations.

FIG. 2 is a flowchart diagram that illustrates a process for authorizing a user of a router, in accordance with some implementations. In some implementations, one or more of the operations in this process might be performed by software running on router 103 in FIG. 1. As depicted in FIG. 2, the software receives configuration data that specifies a social networking service as a source for authentication according to an authentication protocol, in operation 201. In some implementations, the authentication protocol might be an OAuth authentication protocol. However in other implementations, the authentication protocol might be specified by some other standard that supports access codes or tokens of limited duration or scope. In operation 202, the software receives packet data (e.g., according to the WiFi protocol) from a client device (e.g., smartphone or tablet) for a destination, e.g., other than the social networking service specified in the configuration data. In operation 203, the software transmits an identification number (which might include alphabetic, numeric, or other human-readable characters) for the router to the social networking service and requests that a login view (e.g., dialog) for the social networking service be displayed on software (e.g., browser or hybrid app) running on client device. Then in operation 204, the software transmits the login data (e.g., username and password) entered in the login view to the social networking service. And in operation 205, the software receives (e.g., directly from the social networking service or indirectly from the social networking service through the client device) an authorization code (e.g., a token) following successful login by a user identified (e.g., as a friend, contact, neighbor, etc.) on an access control list (ACL) that is (1) associated with the identification number and (2) maintained by the social networking service. In some implementations, the router software itself transmits the login data for the user to the social networking service. Then in operation 206, the software transmits packet data to the destination.

In operation 201, the software (e.g., on a router) receives configuration data that specifies a social networking service as a source for authentication according to an authentication protocol. However, in some implementations, the software service serving as a source for authentication might not be a social networking service, but rather some other software service which has implemented an authentication protocol (e.g., an Internet service provider (ISP)).

Similarly, in operation 203, the software transmits the identification number for the router to the social networking service so that authorization software on the social networking service can match the identification number to an ACL that identifies authorized users. In some implementations, the router itself might maintain the ACL that identifies authorized users, e.g., through additional configuration or by synching periodically with an ACL maintained by the social networking service in order to keep the local version of the ACL up-to-date. (In this regard, it will be appreciated that the router receives the username and password for a user who is logging in, to transmit them to the social networking service. So the router is in a position to determine whether a user is on an ACL.) In such implementations, it might be superfluous to transmit the identification number of the router to the social networking service.

In operation 205, the software receives (e.g., directly from the social networking service or indirectly from the social networking service through the client device) an authorization code (e.g., a token) following successful login by a user identified on an ACL. It will be appreciated that the ACL might be based on groups in a social graph such as family members, close friends, employees, business invitees, guests, etc., of the owner of the router, in an example scenario. Such groups might have varying access rights and privileges, which, in turn, might be reflected in the duration and/or scope of the authorization code (e.g., token) received from the social networking service. So, for example, members of an ACL associated with family members might receive more bandwidth from the router than members of an ACL associated with friends. In a degenerate but useful scenario, the ACL might include only the owner of the router, e.g., in order to enhance security with respect to use of the router.

Similarly, in some implementations, the authorization code might be limited in terms of duration or scope, to minimize unauthorized use or to control authorized use. For example, an authorization code might be valid for a limited duration, e.g., three hours, in order to minimize the extent of unauthorized use that might result from a fraudulent login. Or, if the user is identified as a minor on an ACL, the authorization code might not allow data packets to be sent to a specific software service, e.g., a software service with adult or pornographic content.

Figure 3A:
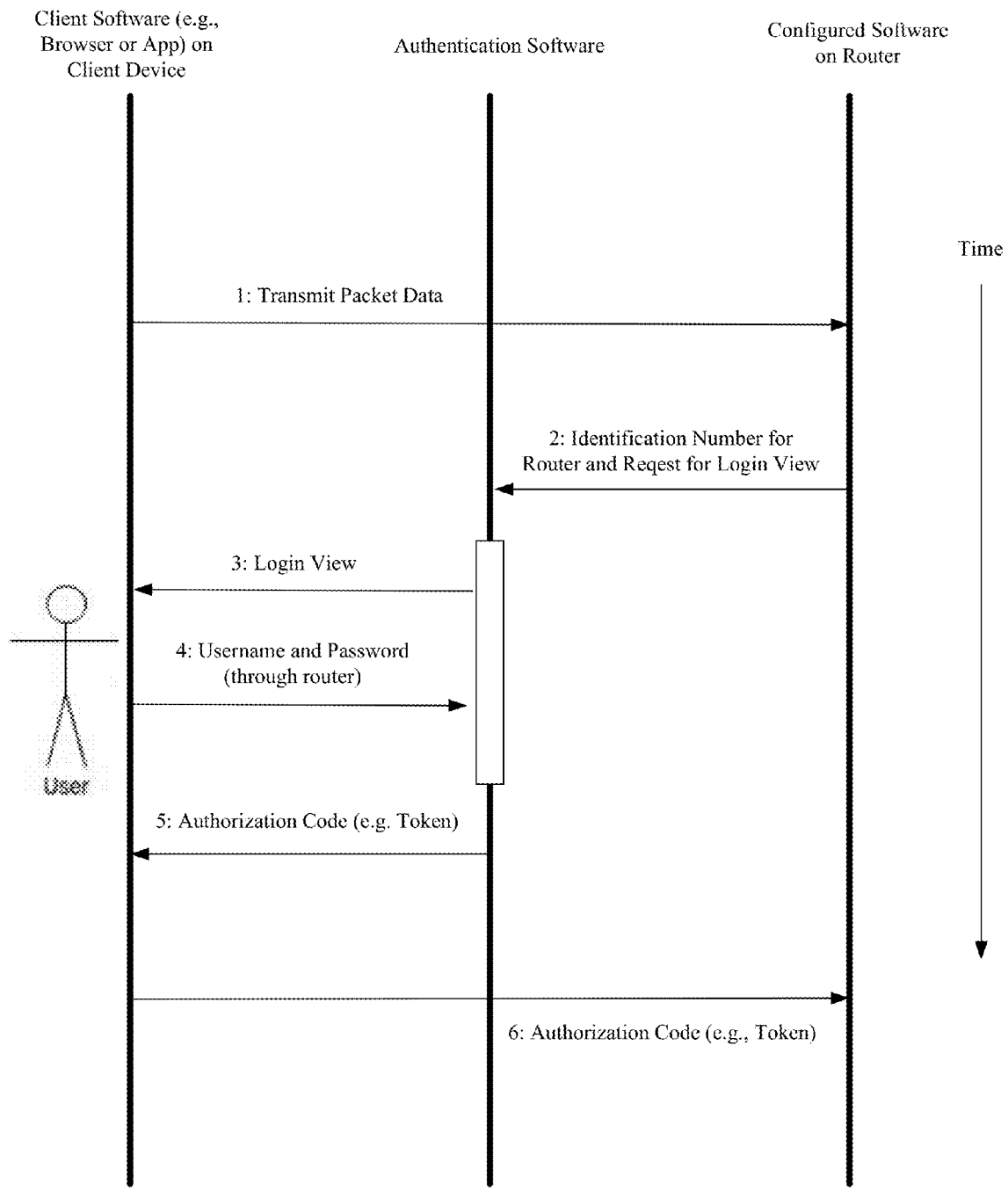
FIG. 3A is a sequence diagram illustrating a process for authorizing a user of a router, in accordance with some implementations.

FIG. 3A is a sequence diagram illustrating a process for authorizing a user of a router, in accordance with some implementations. It will be appreciated that this sequence diagram describes some of the process operations described in FIG. 2. In operation 1 of FIG. 3A, client software (e.g., a browser or app) on a client device (e.g., smartphone, tablet, laptop, etc.) transmits packet data to the configured software on a router. As described earlier, the software on the router might be configured to specify a social networking service as a source for authentication according to an authentication protocol. In operation 2 in FIG. 3A, the router software transmits an identification number for the router to authentication software (e.g., on a server at a social networking service), along with a request for a login view to be displayed by the client software on the client device (e.g., as identified through the packet header). And in operation 3, the authentication software transmits the login view to the client software, which displays it. In operation 4, the client software receives a username and password from a user and transmits them to the authentication software. It will be appreciated that the username and password are transmitted to the authentication software through the router; that is to say, an exception is made for this packet data. If the user is authenticated and is on an ACL associated with the identification number, the authentication software transmits an authorization code (e.g., a token) to the client software, in operation 5. Then in operation 6, the client software transmits the authorization code (e.g., a token) to the router software, which proceeds to transmit the packet data to the destination (e.g., as identified in the packet header).

Figure 3B:
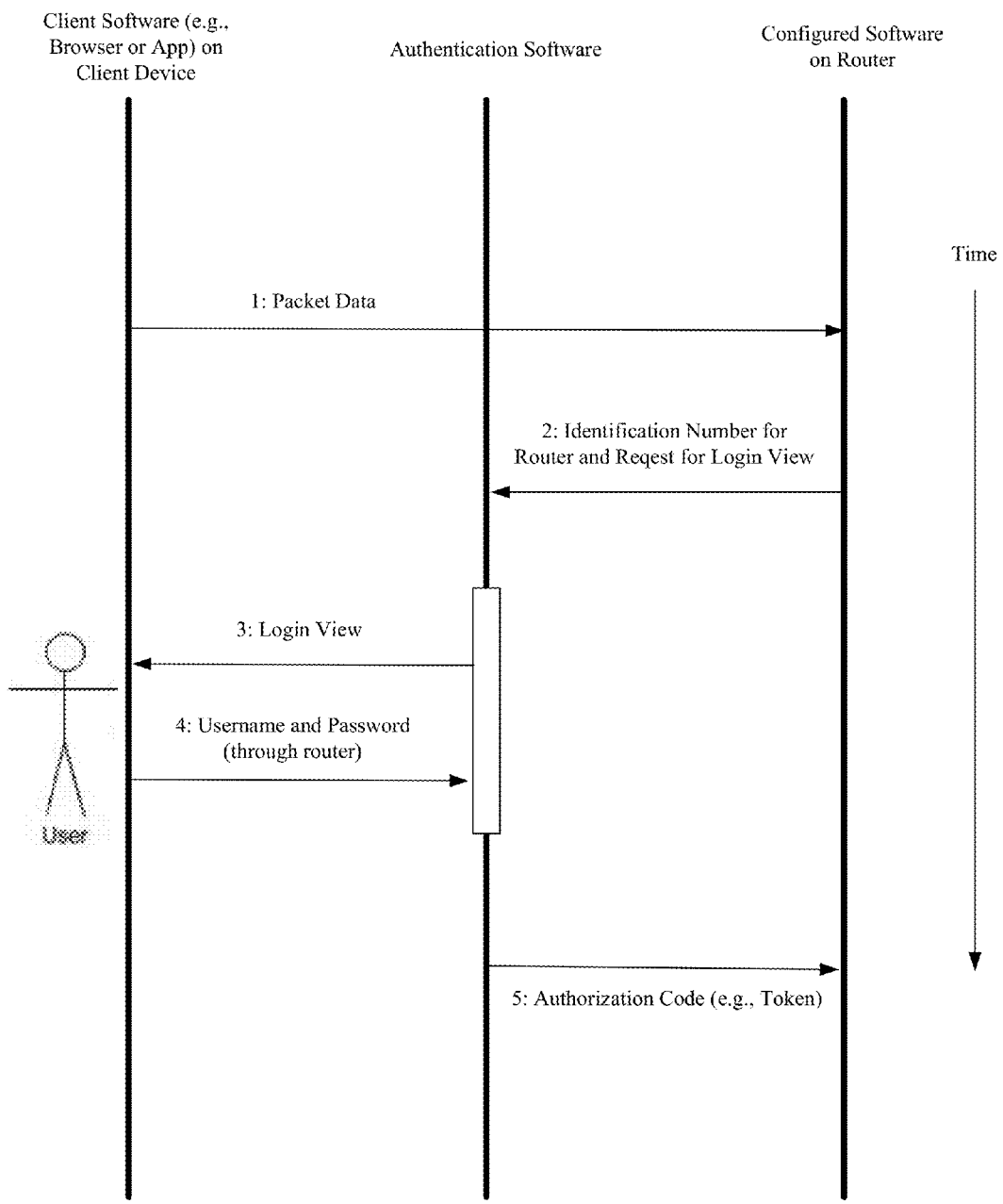
FIG. 3B is another sequence diagram illustrating a process for authorizing a user of a router, in accordance with some implementations.

FIG. 3B is another sequence diagram illustrating a process for authorizing a user of a router, in accordance with some implementations. Here again this sequence diagram describes some of the process operations described in FIG. 2. In operation 1 of FIG. 3A, client software (e.g., a browser or app) on a client device (e.g., smartphone, tablet, laptop, etc.) transmits packet data to the configured software on a router. As described earlier, the software on the router might be configured to specify a social networking service as a source for authentication according to an authentication protocol. In operation 2 in FIG. 3A, the router software transmits an identification number for the router to the authentication software on a server (e.g., at a social networking service), along with a request for a login view to be displayed by the client software on the client device (e.g., as identified through the packet header). And in operation 3, the authentication software transmits the login view to the client software, which displays it. In operation 4, the client software receives a username and password from a user and transmits them to the authentication software. It will be appreciated that the username and password are transmitted to the authentication software through the router; that is to say, an exception is made for this packet data. If the user is authenticated and is on an ACL associated with the identification number, the authentication software transmits an authorization code (e.g., a token) to the router rather than the client device, in operation 5, and the router proceeds to transmit the packet data to the destination (e.g., as identified in the packet header).

Figure 4:
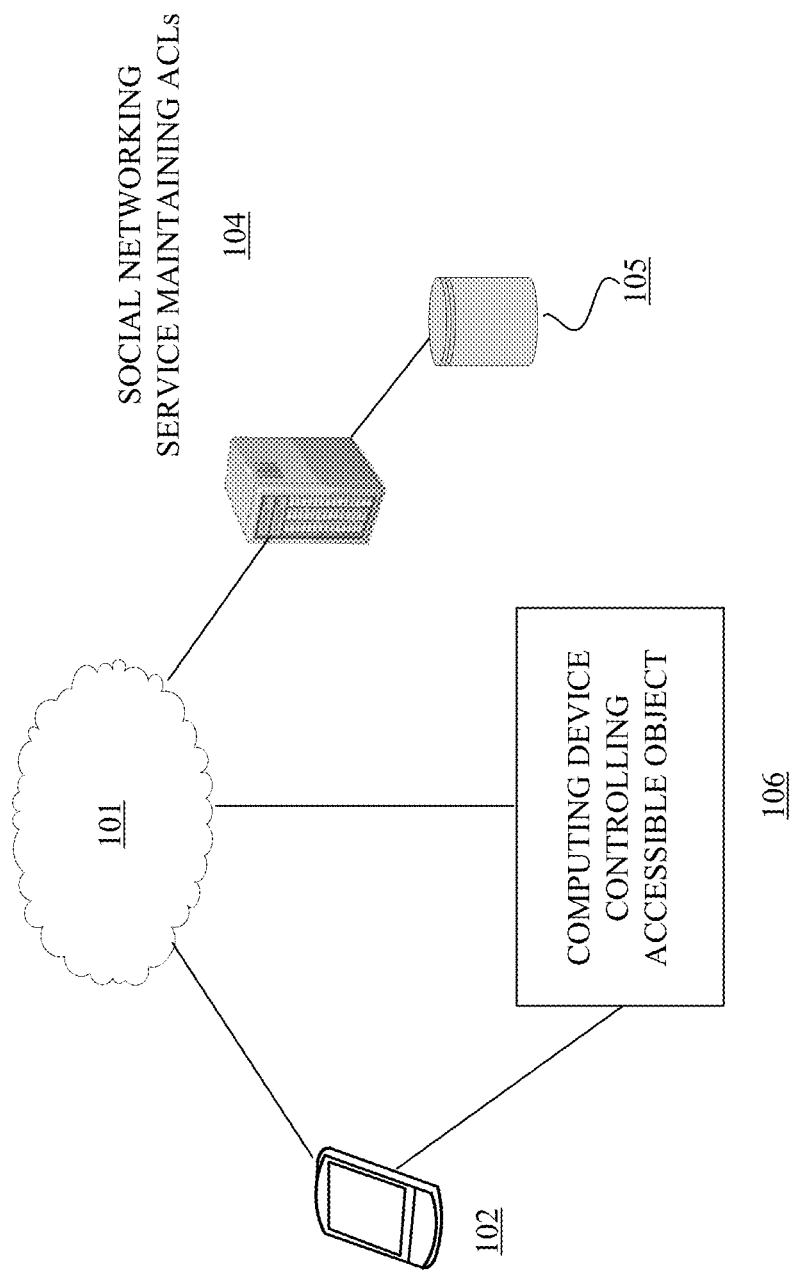
FIG. 4 is a network diagram for an accessible object, in accordance with some implementations.

FIG. 4 is a network diagram for an accessible object, in accordance with some implementations. In many respects, this network diagram is similar to the network diagram shown in FIG. 1 and includes a computing device 102 and a software service 104 hosting an online social network, both of which are connected to a network 101. However, the network diagram in FIG. 4 contains no configurable router but does contain a computing device 106 with software controlling an accessible object. In some implementations, computing device 106 might also connected to network 101 (e.g., using a WiFi protocol) and to computing device 102 (e.g., using a Bluetooth protocol or USB cable). As used in this disclosure, an "accessible object" is an object (e.g., a physical or virtual object) such as a space (e.g., a building, a room, an event space, etc.), an electro-mechanical device (e.g., an automobile, a digital camera, etc.), a software service that is separate from the social networking service, etc. The accessible object can be distinct or separate from the social networking service. It will be appreciated that the router described above is a specific example of an accessible object. In some implementations, an accessible object does not include the physical storage (e.g., volatile or persistent) used by a social networking service to store content, ACLs, etc., related to social graphs.

Figure 5:
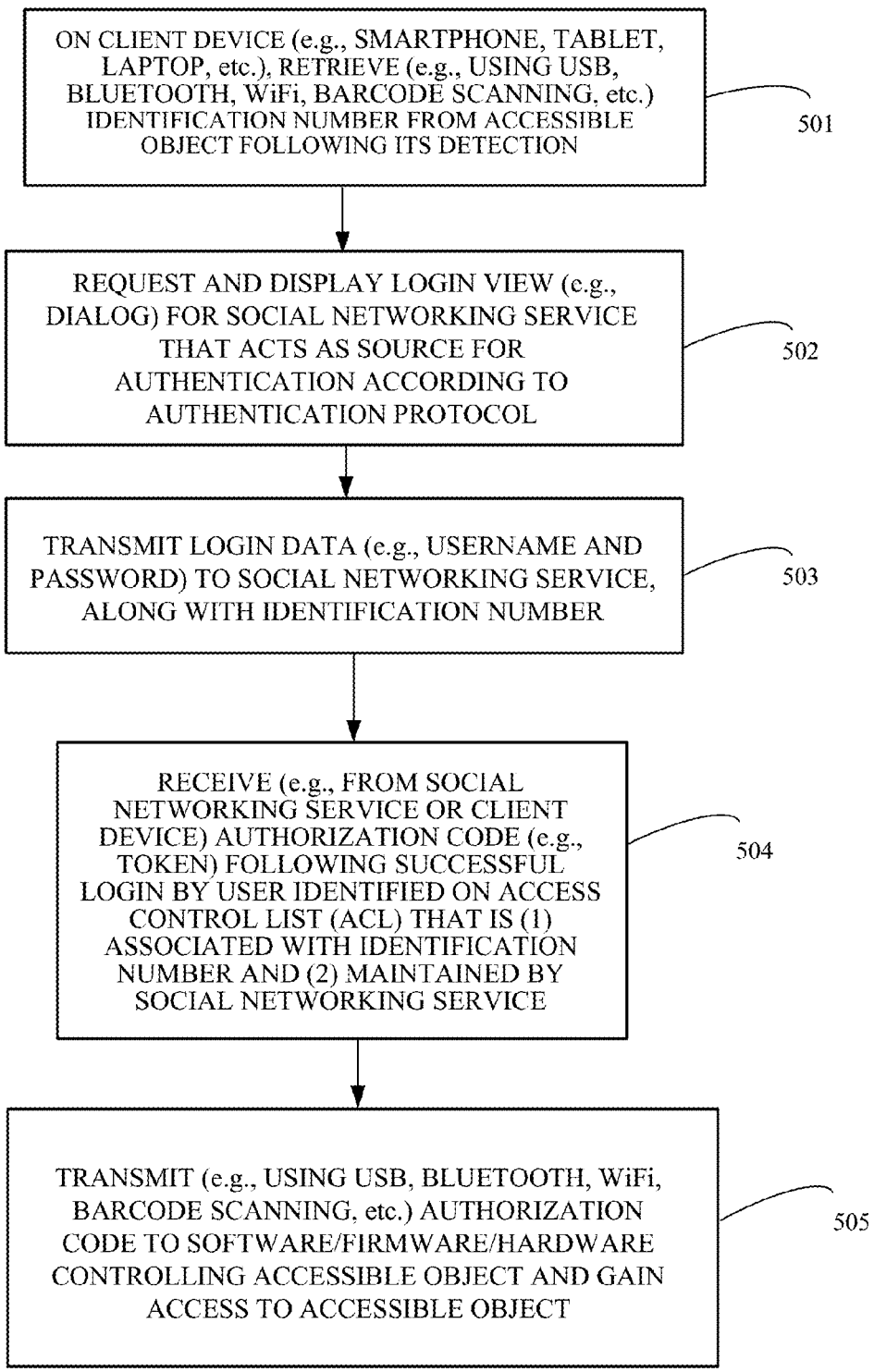
FIG. 5 is a flowchart diagram that illustrates a process for authorizing a user of an accessible object, in accordance with some implementations.

FIG. 5 is a flowchart diagram that illustrates a process for authorizing a user of an accessible object, in accordance with some implementations. In some implementations, one or more of the operations in this process might be performed by client software running on computing device 102 (e.g., a smartphone, tablet, or laptop) in FIG. 4. As depicted in FIG. 5, the software retrieves (e.g., using USB, Bluetooth, WiFi, barcode scanning, etc.) an identification number from accessible object following detection of the accessible object, in operation 501. In operation 502, the software requests and displays a login view (e.g., a dialog) for a social networking service that acts as source for authentication according to an authentication protocol. And in operation 503, the software transmits the login data (e.g., username and password) for a user to the social networking service, along with the identification number. In operation 504, the software receives an authorization code from the social networking service, if the user of the client device is identified on an access control list (ACL) that is (1) associated with the identification number and (2) maintained by the social networking service. Here again, it will be appreciated that such an ACL might include the family members, close friends, employees, business invitees, guests, etc., of the owner of the accessible object, in an example scenario. Such groups might have varying access rights and privileges, which, in turn, might be reflected in the duration and/or scope of the authorization code (e.g., token) received from the social networking service. In a degenerate but useful scenario, the ACL might include only the owner of the accessible device, e.g., in order to enhance security with respect to use of the accessible device. Then in operation 505, the software transmits (e.g., using USB, Bluetooth, WiFi, barcode scanning, etc.) the authorization code to software/firmware/hardware controlling the accessible object (e.g., space or electro-mechanical device) and gains access to the accessible object.

In operation 502, the software requests and displays a login view (e.g., a dialog) for a social networking service that acts as source for authentication according to an authentication protocol. Here again, in some implementations, the software service serving as a source for authentication might not be a social networking service, but rather some other software service which has implemented an authentication protocol (e.g., a home-security service).

Similarly, in operation 503, the software transmits the identification number for the router to the social networking service so that authorization software on the social networking service can match the identification number to an access control list that identifies authorized users of the accessible object associated with the identification number. In some implementations, the client software on the client device might maintain an ACL (e.g., in a secure part of the registry or other system database) that identifies authorized users of the accessible object associated with the identification number. In such implementations, the client software might synch periodically with an ACL maintained by the social networking service, in order to keep the local list of authorized users up-to-date. (In this regard, it will be appreciated that the client device receives the username and password for a user who is logging in, to transmit them to the social networking service. So the client device is in a position to determine whether a user is on an ACL associated with a retrieved identification number.) In such implementations, it might be superfluous to transmit the identification number of the accessible object to the social networking service, since the identification number for the accessible object is stored on the client device (e.g., in a secure part of the registry or other system database).

It will be appreciated that the operations described in FIG. 5 might be used to replace employee badges that allow for remote keyless entry (RKE) to the various spaces of an employer's facility, e.g., offices, conference rooms, company cafeterias, company fitness centers, etc. Such spaces might be associated with differing levels of security, which might be reflected in differing levels of authorization. Thus, to gain access to a high-level security space in an employer's facility (e.g., a lab), an employee might be required to enter a secondary password or other enhanced form of authentication (e.g., fingerprint recognition or authentication), e.g., in operations 502 and 503 of FIG. 5. Similarly, if the accessible object is an electro-mechanical device, such an enhanced form of authentication might be required if the device is relatively expensive, e.g., an automobile.

Here again, in some implementations, the authorization code might also be limited in terms of duration or scope (e.g., geographic scope, functional scope, etc.), to minimize unauthorized use or to control authorized use. For example, an authorization code might be valid for a limited duration, e.g., three hours, in order to minimize the extent of unauthorized use that might result from a fraudulent login. Or the access might be limited to specific functionality of the accessible object, e.g., opening the door of an automobile, but not starting its engine.

Figure 6:
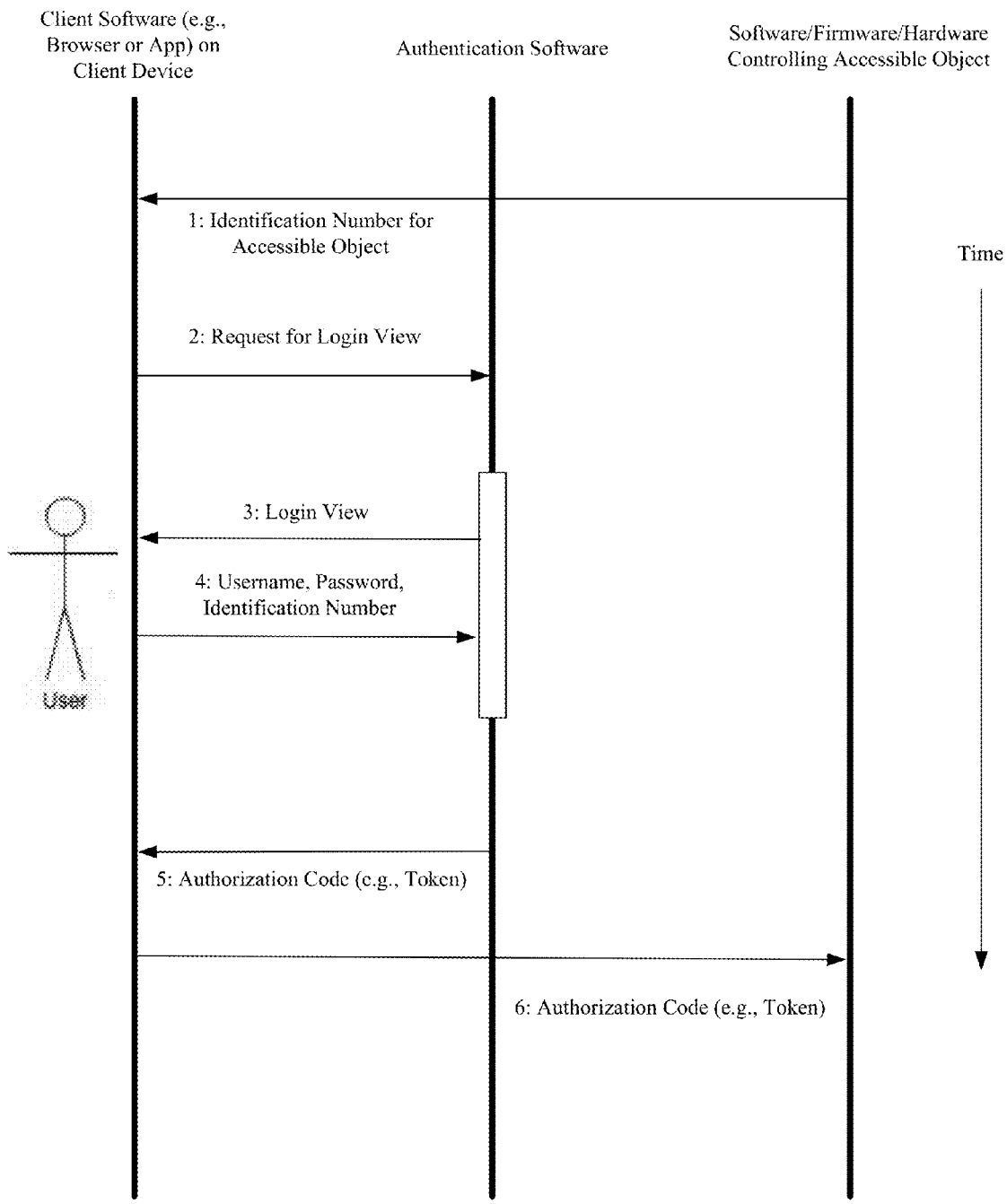
FIG. 6 is a sequence diagram illustrating a process for authorizing a user of an accessible object, in accordance with some implementations.

FIG. 6 is a sequence diagram illustrating a process for authorizing a user of an accessible object, in accordance with some implementations. It will be appreciated that this sequence diagram describes some of the process operations described in FIG. 5. In operation 1 of FIG. 6, client software (e.g., an application or app) on a client device (e.g., smartphone, tablet, laptop, etc.) retrieves (e.g., using USB, Bluetooth, WiFi, barcode scanning, etc.) an identification number from software/firmware/hardware controlling an accessible object, following detection of the accessible object. In operation 2, the client software transmits a request for a login view to authentication software (e.g., on a server at a social networking service). And in operation 3, the authentication software transmits the login view to the client software, where it is displayed. In operation 4, the client software receives a username and password from a user and transmits them to the authentication software. If the user is authenticated and is on an ACL associated with the identification number, the authentication software transmits an authorization code (e.g., a token) to the client software, in operation 5. Then in operation 6, the client software transmits the authorization code (e.g., a token) to the software/firmware/hardware controlling an accessible object to gain access to it.

Figure 7:
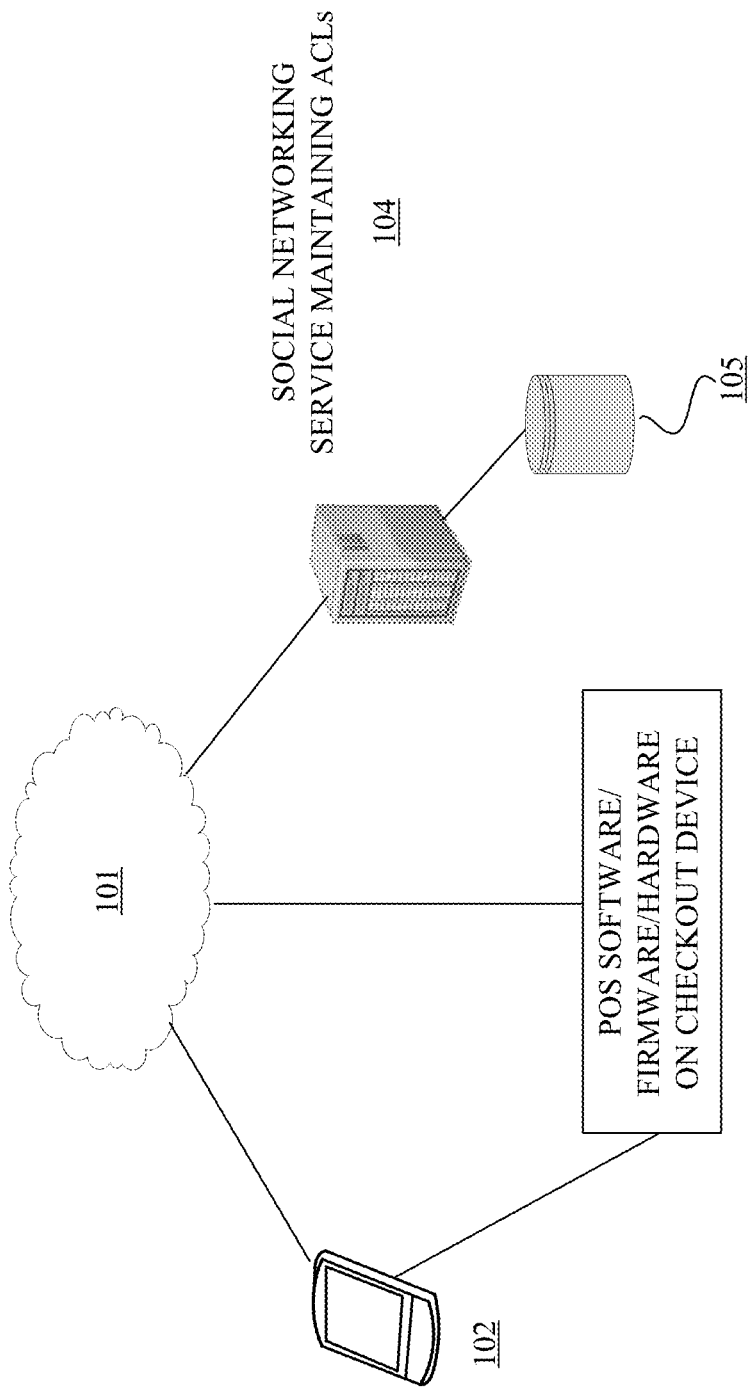
FIG. 7 is a network diagram for a checkout device, in accordance with some implementations.

FIG. 7 is a network diagram for a checkout device, in accordance with some implementations. In many respects, this network diagram is similar to the network diagram shown in FIG. 1 and includes a computing device 102 and a software service 104 hosting an online social network, both of which are connected to a network 101. However, the network diagram in FIG. 7 contains no configurable router but does contain a checkout device 107 with point-of-sale (POS) software/firmware/hardware. In some implementations, checkout device 107 might also be connected to network 101 (e.g., using a WiFi protocol) and the POS software might be cloud-based. Also, in some implementations, checkout device 107 might be connected directly to computing device 102 (e.g., using a Bluetooth protocol or USB cable).

Figure 8:
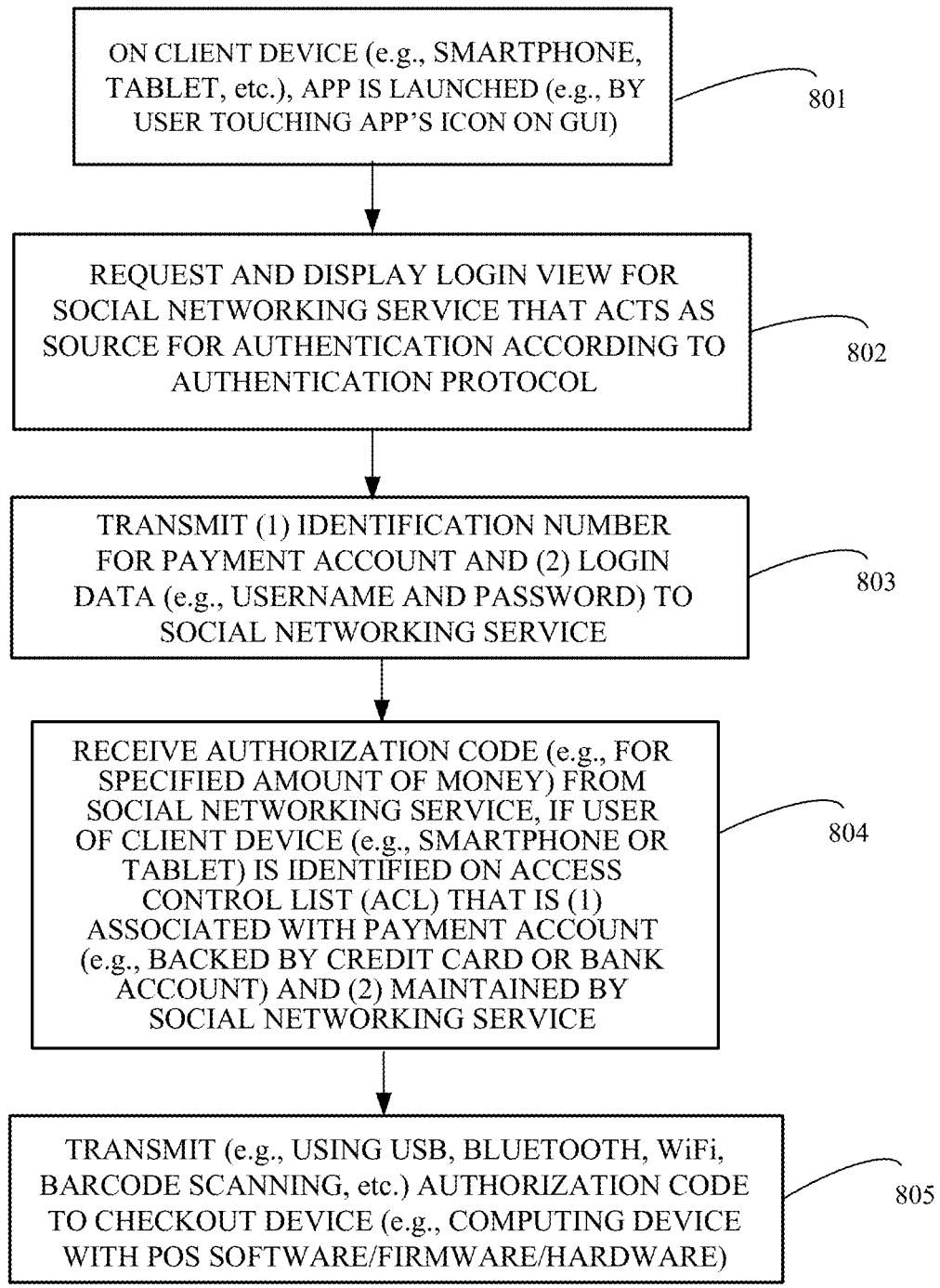
FIG. 8 is a flowchart diagram that illustrates a process for mobile payment, in accordance with some implementations.

FIG. 8 is a flowchart diagram that illustrates a process for mobile payment, in accordance with some implementations. In some implementations, one or more of the operations in this process might be performed by client software (e.g., an application or app) running on computing device 102 (e.g., a smartphone, tablet, or laptop) in FIG. 7. As depicted in FIG. 8, the software (e.g., an app) is launched (e.g., by a user touching the app's icon on a graphical user interface (GUI)), in operation 801. In operation 802, the software requests and displays a login view (e.g., a dialog) for a social networking service that acts as source for authentication according to an authentication protocol. And in operation 803, the software transmits (1) an identification number (e.g., entered by the user or stored in a secure part of the registry or system database) for a payment account and (2) login data (e.g., username and password) for a user to the social networking service. In operation 804, the software receives an authorization code (e.g., for a specified amount of money) from the social networking service, if the user of the client device is identified on an access control list (ACL) that is (1) associated with the payment account (e.g., which might backed by a credit card or bank account) and (2) maintained by the social networking service. Then in operation 805, the software transmits (e.g., using USB, Bluetooth, WiFi, barcode scanning, etc.) the authorization code to a checkout device (e.g., a computing device with POS software/firmware/hardware) to facilitate the purchase of a food item, a beverage, a retail good, etc.

In operation 802, the software requests and displays a login view (e.g., a dialog) for a social networking service that acts as source for authentication according to an authentication protocol. Here again, in some implementations, the software service serving as a source for authentication might not be a social networking service, but rather some other software service which has implemented an authentication protocol (e.g., an online banking service).

Similarly, in operation 804, the software receives an authorization code (e.g., for a specified amount of money) from the social networking service, if the user of the client device is identified on an ACL that is (1) associated with the payment account and (2) maintained by the social networking service. In some implementations, the client device itself might maintain the ACL (e.g., in persistent storage such as a secure part of the registry or other system database) that identifies authorized users, e.g., by synching periodically with an ACL maintained by the social networking service in order to keep the local version of the ACL up-to-date. (In this regard, it will be appreciated that the client device receives the username and password for a user who is logging in, to transmit them to the social networking service. So the client device is in a position to determine whether a user is on an ACL associated with the identification number for a payment account.)

Figure 9:
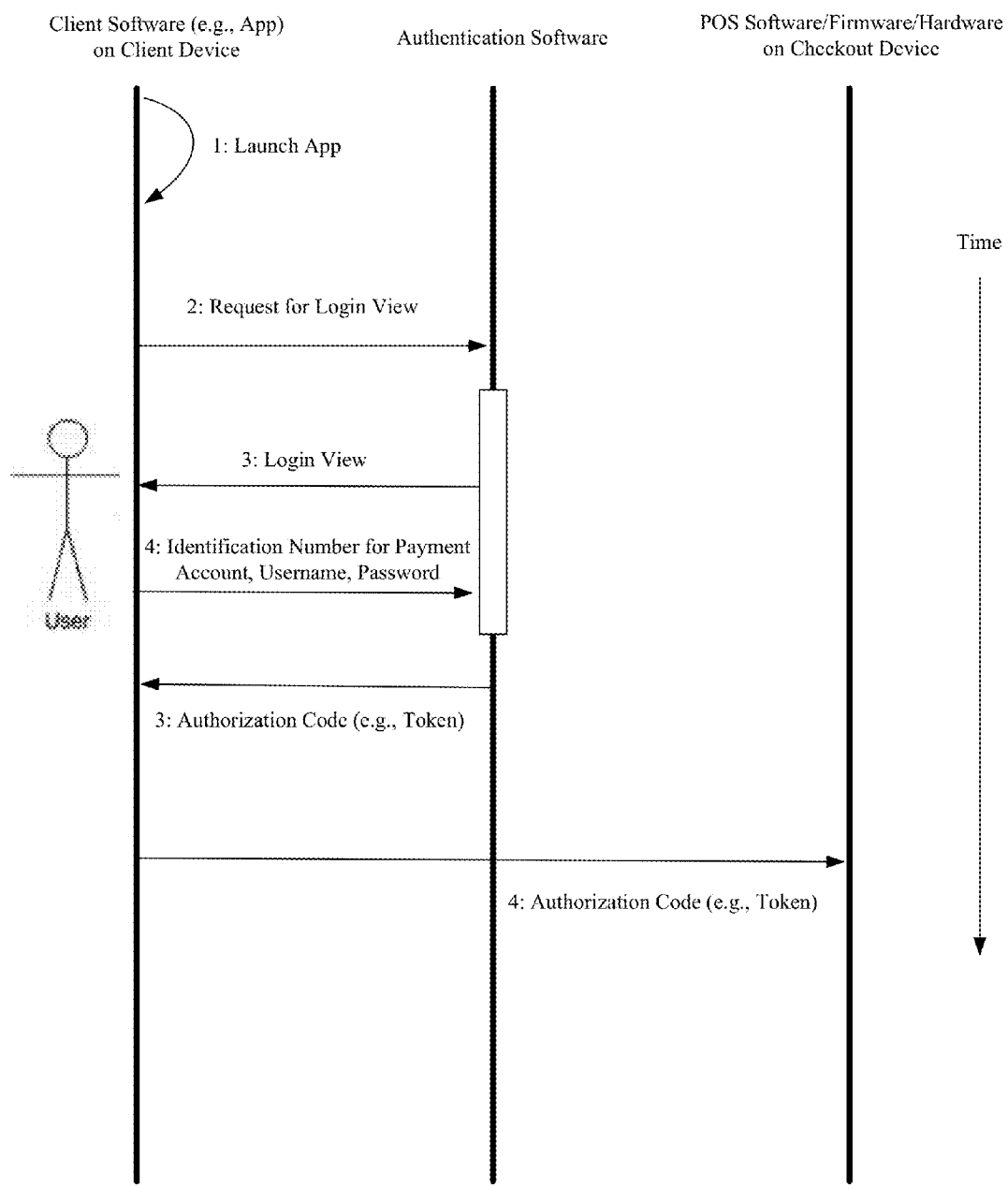
FIG. 9 is a sequence diagram illustrating a process for mobile payment, in accordance with some implementations.

FIG. 9 is a sequence diagram illustrating a process for mobile payment, in accordance with some implementations. It will be appreciated that this sequence diagram describes some of the process operations described in FIG. 8. In operation 1 of FIG. 9, client software (e.g., an app) is launched on a client device (e.g., a smartphone or tablet), e.g., by a user touching the app's icon on a graphical user interface (GUI). In operation 2, the client software transmits a request for a login view to authentication software on a server at a social networking service. And in operation 3, the authentication software transmits the login view to the client software, where it is displayed. In operation 4, the client software receives and/or retrieves (e.g., from persistent storage such as a secure part of the registry or system database) an identification number for a payment account and (2) a username and password for a user and transmits them to the authentication software. If the user is authenticated and is on an ACL associated with the identification number for the payment account, the authentication software transmits an authorization code for a specified amount of money to the client software, in operation 5. Then in operation 6, the client software transmits the authorization code to a checkout device (e.g., a computing device with POS software/firmware/hardware) to facilitate the purchase of a food item, a beverage, a retail good, etc.

Still other implementations involve another computer-implemented method. According to this method, software provides for display a login view for a social networking service. The social networking service acts as a source for authentication according to an authentication protocol. Providing the technical effect that the information required for authentication and authorization is maintained centrally by a social networking service, thus avoiding duplication of such information, thus facilitating maintenance of such information, and thus providing consistent information for authentication and authorization. Moreover, the settings of access control lists (ACLs) may be controlled by the users of the social networking service, thus enhancing user control over authorization information and simplifying maintenance of authorization information. The software receives an authorization code from the social networking service, if a user of a client device is identified on an ACL for an accessible object that is separate from the social networking service. Then the software transmits the authorization code to a controller for the accessible object and gains access to the accessible object. Providing the technical effect that the accessible object may not be involved in processing the authentication protocol. In particular, login data, such as username and password, of a user to a social networking service may not be exposed to the accessible device during the authentication protocol, thus limiting the spread of critical login data, thus enhancing system security and privacy.

With the above implementations in mind, it should be understood that they might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the above implementations are useful machine operations. The above implementations also relate to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The above implementations can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Although the above implementations have been described in some detail for purposes of clarity of understanding, it will be apparent that certain changes and modifications can be practiced within the scope of the following claims. For example, some or all of the operations described above might be used on a social networking service to facilitate network communication between a user's accessible objects. Thus, a user's automobile might transmit a diagnostic report about itself over the Internet to one of the user's computers, using authentication provided by a social networking service, as described in this disclosure. Moreover, the operations described above can be ordered, modularized, and/or distributed in any suitable way. Accordingly, the present implementations are to be considered as illustrative and not restrictive, and the above implementations are not to be limited to the details given herein, but may be modified within the scope and equivalents of the following claims. In the following claims, elements and/or steps do not imply any particular order of operation, unless explicitly stated in the claims or implicitly required by the disclosure.

What is claimed is:

1. A computer-implemented method, comprising operations of:
   receiving configuration data at a router that specifies a social networking service as a source for authentication according to an authentication protocol;
   receiving packet data from a client device for a destination other than the social networking service;
   causing software on the client device to request login for the social networking service;
   transmitting to the social networking service login data responsive to the login request;
   receiving an authorization code following a successful login by a user identified on an access control list (ACL); and
   transmitting the packet data to the destination.

2. The method as in claim 1, wherein the router transmits and receives data according to a WiFi protocol.

3. The method as in claim 1, wherein access resulting from the authorization code is limited in duration.

4. The method as in claim 1, wherein access resulting from the authorization code is limited in scope.

5. The method as in claim 1, wherein the access control list is maintained by the social networking service.

6. The method as in claim 1, wherein the access control list is maintained by the router.

7. A non-transitory computer-readable storage medium persistently storing a program, wherein the program, when executed, instructs a processor to perform the following operations:
   receive configuration data at a router that specifies a social networking service as a source for authentication according to an authentication protocol;
   receive packet data from a client device for a destination other than the social networking service;
   cause software on the client device to request login for the social networking service;
   transmit to the social networking service login data responsive to the login request;
   receive an authorization code following a successful login by a user identified on an access control list (ACL) maintained by the social networking service; and
   transmit the packet data to the destination.

8. The non-transitory computer-readable storage medium of claim 7, wherein the router transmits and receives data according to a WiFi protocol.

9. The non-transitory computer-readable storage medium of claim 7, wherein access resulting from the authorization code is limited in duration.

10. The non-transitory computer-readable storage medium of claim 7, wherein access resulting from the authorization code is limited in scope.

11. The non-transitory computer-readable storage medium of claim 7, wherein the access control list is maintained by the social networking service.

12. The non-transitory computer-readable storage medium of claim 7, wherein the access control list is maintained by the router.

13. A system, comprising:
one or more processors; and
a memory disposed in communication with the one or more processors and storing processor-executable instructions, the instructions comprising instructions to:
receive configuration data at a router that specifies a social networking service as a source for authentication according to an authentication protocol;
receive packet data from a client device for a destination other than the social networking service;
cause software on the client device to request login for the social networking service;
transmit to the social networking service login data responsive to the login request;
receive an authorization code following a successful login by a user identified on an access control list (ACL) maintained by the social networking service; and
transmit the packet data to the destination.

14. The system of claim 13, wherein the router transmits and receives data according to a WiFi protocol.

15. The system of claim 13, wherein access resulting from the authorization code is limited in duration.

16. The system of claim 13, wherein access resulting from the authorization code is limited in scope.

17. The system of claim 13, wherein the access control list is maintained by the social networking service.

18. The system of claim 13, wherein the access control list is maintained by the router.

* * * * *